US010767891B2

(12) United States Patent
Bogart

(10) Patent No.: US 10,767,891 B2
(45) Date of Patent: Sep. 8, 2020

(54) AUXILIARY HEAT EXCHANGER

(71) Applicant: Johnson Controls Technology Company, Auburn Hills, MI (US)

(72) Inventor: James E. Bogart, Glen Rock, PA (US)

(73) Assignee: Johnson Controls Technology Company, Auburn Hills, MI (US)

( * ) Notice: Subject to any disclaimer, the term of this patent is extended or adjusted under 35 U.S.C. 154(b) by 35 days.

(21) Appl. No.: 15/921,131

(22) Filed: Mar. 14, 2018

(65) Prior Publication Data

US 2019/0257546 A1 Aug. 22, 2019

Related U.S. Application Data

(60) Provisional application No. 62/632,838, filed on Feb. 20, 2018.

(51) Int. Cl.

| | |
|---|---|
| ***F24F 12/00*** | (2006.01) |
| ***F24F 11/77*** | (2018.01) |
| ***F24F 11/83*** | (2018.01) |
| ***F24F 13/30*** | (2006.01) |
| ***F24F 13/22*** | (2006.01) |
| *F24F 110/10* | (2018.01) |

(52) U.S. Cl.

CPC ............ *F24F 12/002* (2013.01); *F24F 11/77* (2018.01); *F24F 11/83* (2018.01); *F24F 13/222* (2013.01); *F24F 13/30* (2013.01); *F24F 2012/005* (2013.01); *F24F 2110/10* (2018.01)

(58) Field of Classification Search

CPC ........ F24F 12/002; F24F 13/222; F24F 13/30; F24F 11/83; F24F 11/77; F24F 2012/005; F24F 2110/10; F24F 3/1405; F24F 12/00

See application file for complete search history.

(56) References Cited

U.S. PATENT DOCUMENTS

| | | | | |
|---|---|---|---|---|
| 4,197,716 A * | 4/1980 | Nussbaum | F25B 13/00 62/196.4 |
| 5,979,172 A * | 11/1999 | Teller | F24F 13/224 62/277 |
| 6,591,902 B1 * | 7/2003 | Trent | F24F 1/0059 165/104.14 |
| 6,658,874 B1 | 12/2003 | Trent | |
| 8,033,322 B1 | 10/2011 | Trent | |

(Continued)

OTHER PUBLICATIONS

Ong, K. S., Review of Heat Pipe Heat Exchangers for Enhanced Dehumidification and Cooling in Air Conditioning Systems, International Journal of Low-Carbon Technologies, vol. 11, pp. 416-423, Advance Access Publication Sep. 24, 2014, Published by Oxford University Press.

*Primary Examiner* — Emmanuel E Duke
(74) *Attorney, Agent, or Firm* — Fletcher Yoder, P.C.

(57) ABSTRACT

Embodiments of the present disclosure are directed toward a heat exchanger that includes an evaporator coil section disposed at least partially within a first flow structure configured to direct a first flow of air across the evaporator coil section, a condenser coil section fluidly coupled with the evaporator coil section and disposed at least partially within a second flow structure configured to direct a second flow of air across the condenser coil section, and an auxiliary heat exchanger fluidly coupled with the evaporator coil section, where the auxiliary heat exchanger is external to the first flow structure.

25 Claims, 7 Drawing Sheets

(56) References Cited

U.S. PATENT DOCUMENTS

| | | | | |
|---|---|---|---|---|
| 9,702,634 | B1 | 7/2017 | Mankaruse | |
| 2007/0151276 | A1* | 7/2007 | Bogart | B01D 5/009<br>62/285 |
| 2012/0186785 | A1 | 7/2012 | Dinh et al. | |
| 2014/0116068 | A1* | 5/2014 | Uselton | F25B 40/02<br>62/3.2 |
| 2018/0038660 | A1 | 2/2018 | Dinnage et al. | |
| 2019/0257546 | A1* | 8/2019 | Bogart | F24F 13/222 |

* cited by examiner

AUXILIARY HEAT EXCHANGER

CROSS REFERENCE TO RELATED APPLICATIONS

This application claims priority from and the benefit of U.S. Provisional Application Ser. No. 62/632,838, entitled "AUXILIARY COIL FOR A HEAT EXCHANGER," filed Feb. 20, 2018, which is hereby incorporated by reference in its entirety for all purposes.

BACKGROUND

The present disclosure relates generally to environmental control systems, and more particularly, to an auxiliary heat exchanger for a heat pipe.

Environmental control systems are utilized in residential, commercial, and industrial environments to control environmental properties, such as temperature and humidity, for occupants of the respective environments. The environmental control system may control the environmental properties through control of an airflow delivered to the environment. For example, a heating, ventilating, and air conditioning (HVAC) system may include a heat pipe heat exchanger that is configured to circulate a working fluid, such as a volatile fluid, through an evaporator coil and a condenser coil without mechanical force. For instance, the working fluid evaporates, or changes from a liquid state to a vapor state, as the working fluid absorbs heat from a first air flow in the evaporator coil. As the working fluid evaporates, a pressure differential is created within the heat pipe, which directs the gaseous working fluid to flow toward and into the condenser coil. The gaseous working fluid then condenses, or changes from the gaseous state to a liquid state, by releasing the heat that was absorbed in the evaporator to a second air flow.

When the second air flow is at a relatively high temperature, the condenser coil may not sufficiently cool the working fluid, such that the working fluid condenses to the liquid state. As such, systems that employ traditional heat pipes generally include an additional cooling coil that is disposed within a flow path of the first air flow. Unfortunately, positioning the additional cooling coil within the flow path of the first air flow increases an amount of fan power utilized to draw air across the evaporator coil and increases an overall size of an air handling system having the heat pipe heat.

SUMMARY

In one embodiment, a heat exchanger includes an evaporator coil section disposed at least partially within a first flow structure configured to direct a first flow of air across the evaporator coil section, a condenser coil section fluidly coupled with the evaporator coil section and disposed at least partially within a second flow structure configured to direct a second flow of air across the condenser coil section, and an auxiliary heat exchanger fluidly coupled with the evaporator coil section, where the auxiliary heat exchanger is external to the first flow structure.

In another embodiment, a heat exchanger for a heating, ventilating, and air conditioning (HVAC) system includes a housing, an evaporator coil section disposed within a first passage of the housing and configured to be in thermal communication with a first flow of air flowing across the evaporator coil section, a condenser coil section in fluid communication with the evaporator coil section and disposed within a second passage of the housing and configured to be in thermal communication with a second flow of air flowing across the condenser coil section, and an auxiliary heat exchanger in fluid communication with the evaporator coil section, where the auxiliary heat exchanger is external to the housing.

In another embodiment, a heat pipe heat exchanger for a heating, ventilating, and air conditioning (HVAC) system includes a first passage having an evaporator coil section, a second passage having a condenser coil section, where the condenser coil section is in fluid communication with the evaporator coil section, and an auxiliary heat exchanger in fluid communication with the evaporator coil section, where the auxiliary heat exchanger is external to the first passage and the second passage.

DRAWINGS

Figure 2:
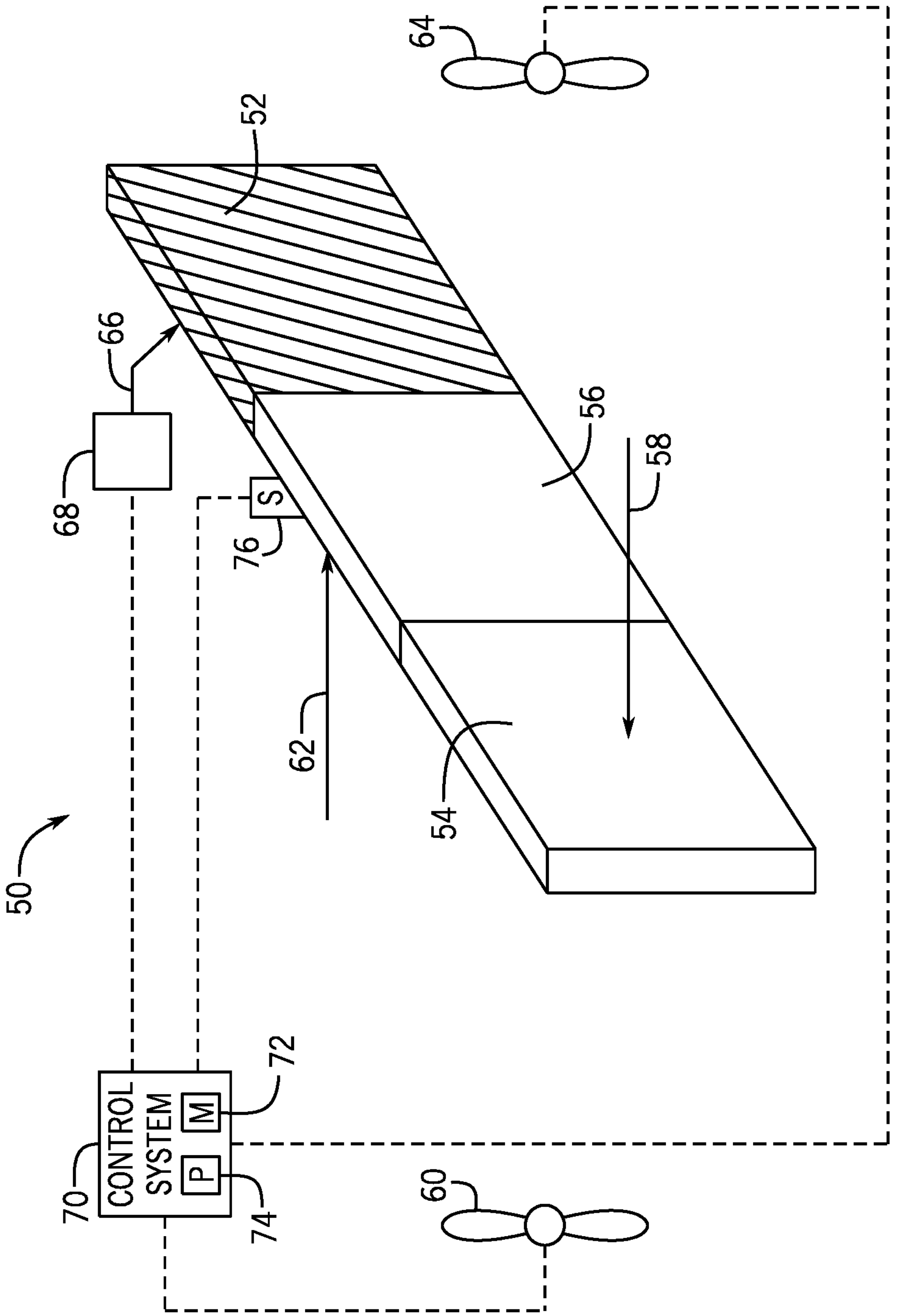
FIG. 2 is a perspective view of an embodiment of a heat pipe heat exchanger having an auxiliary heat exchanger, in accordance with an aspect of the present disclosure.
Figure 4A:
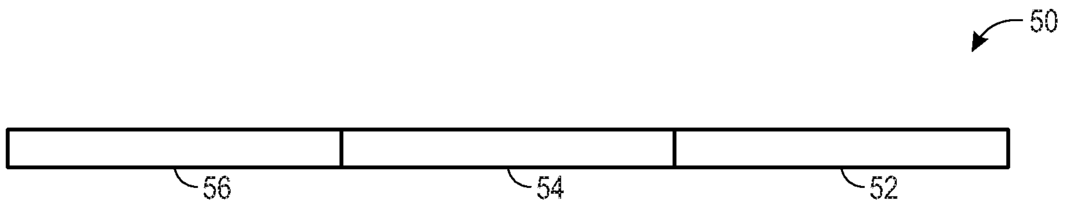
Figure 4B:
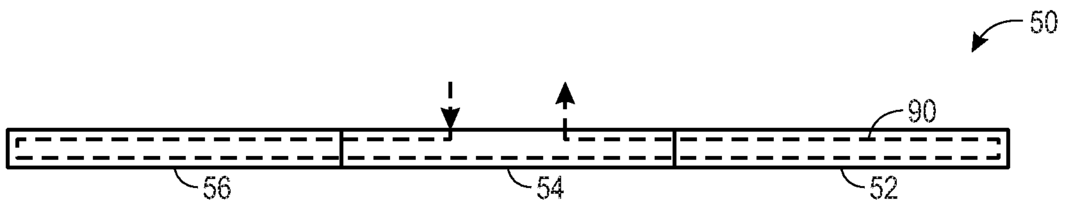
Figure 4C:
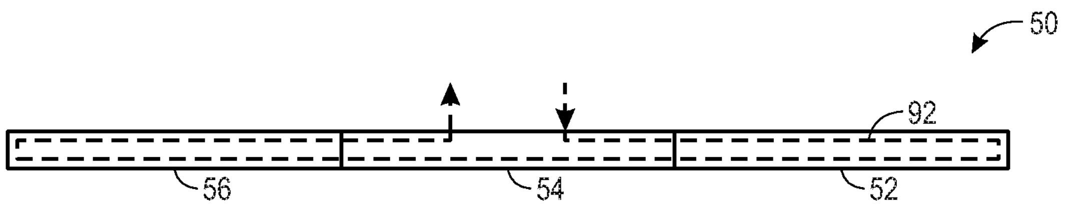
Figure 4D:
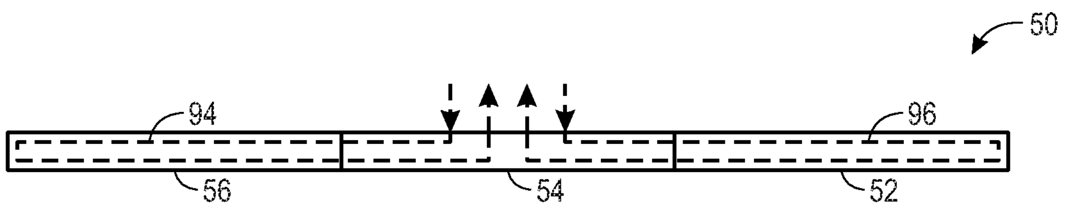
Figure 5:
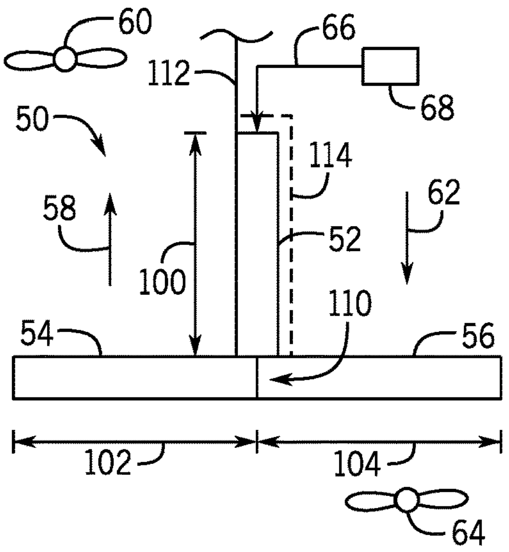
Figure 6:
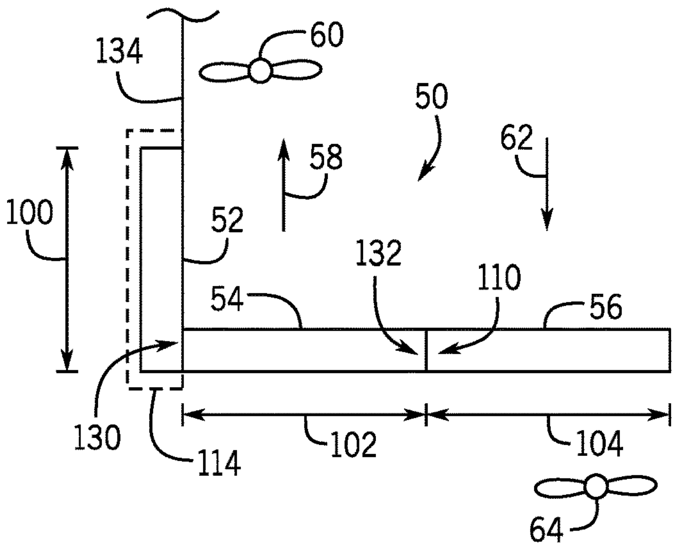
Figure 7:
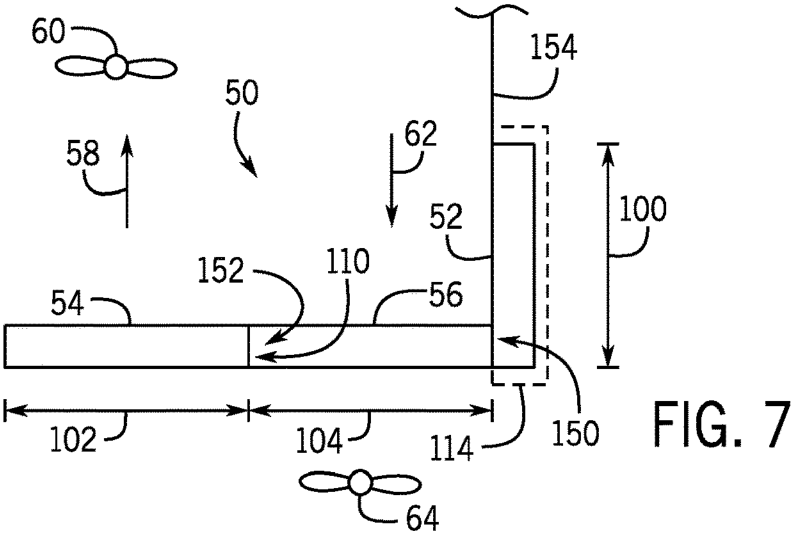
Figure 8:
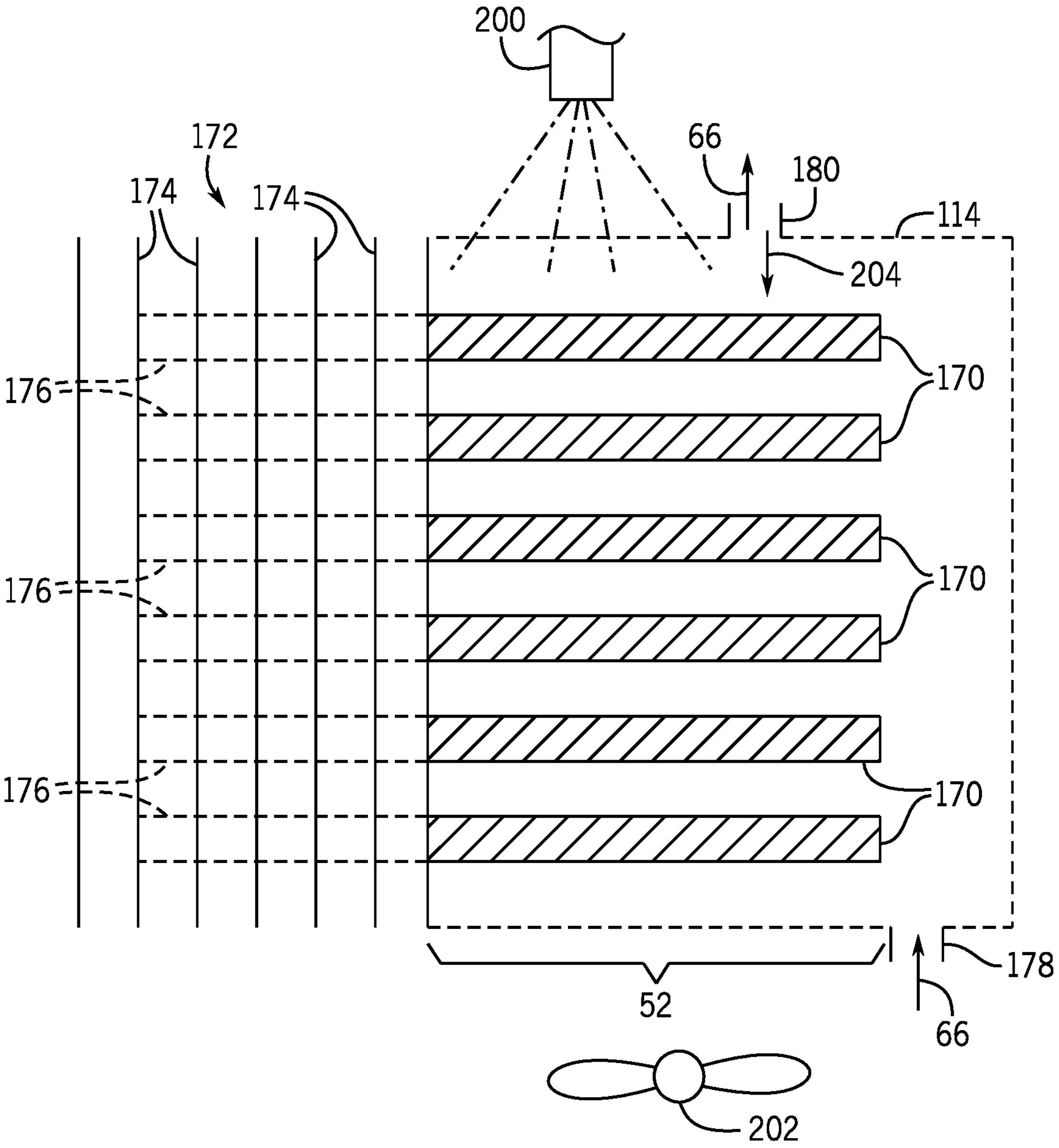
Figure 9:
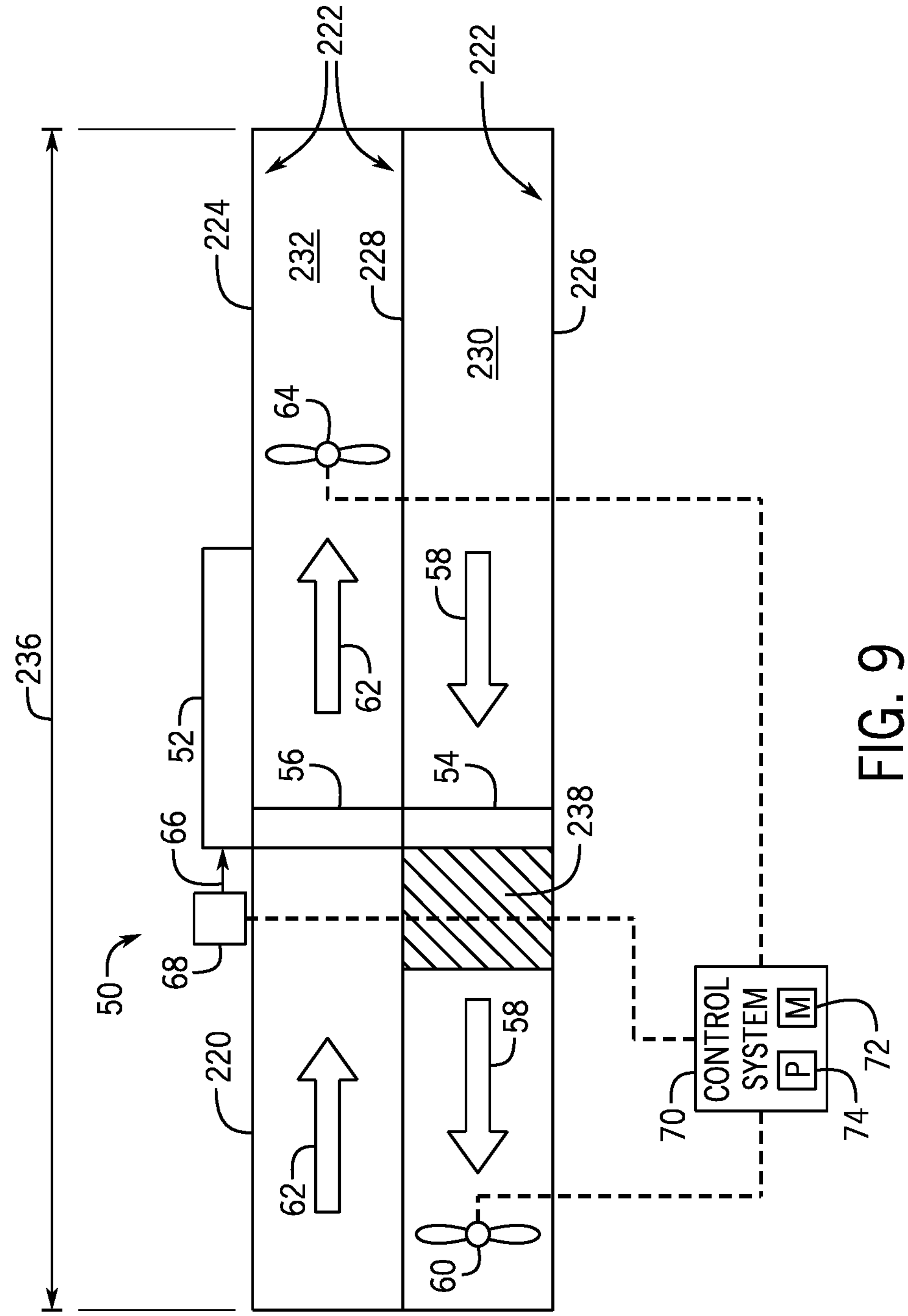
Figure 10:
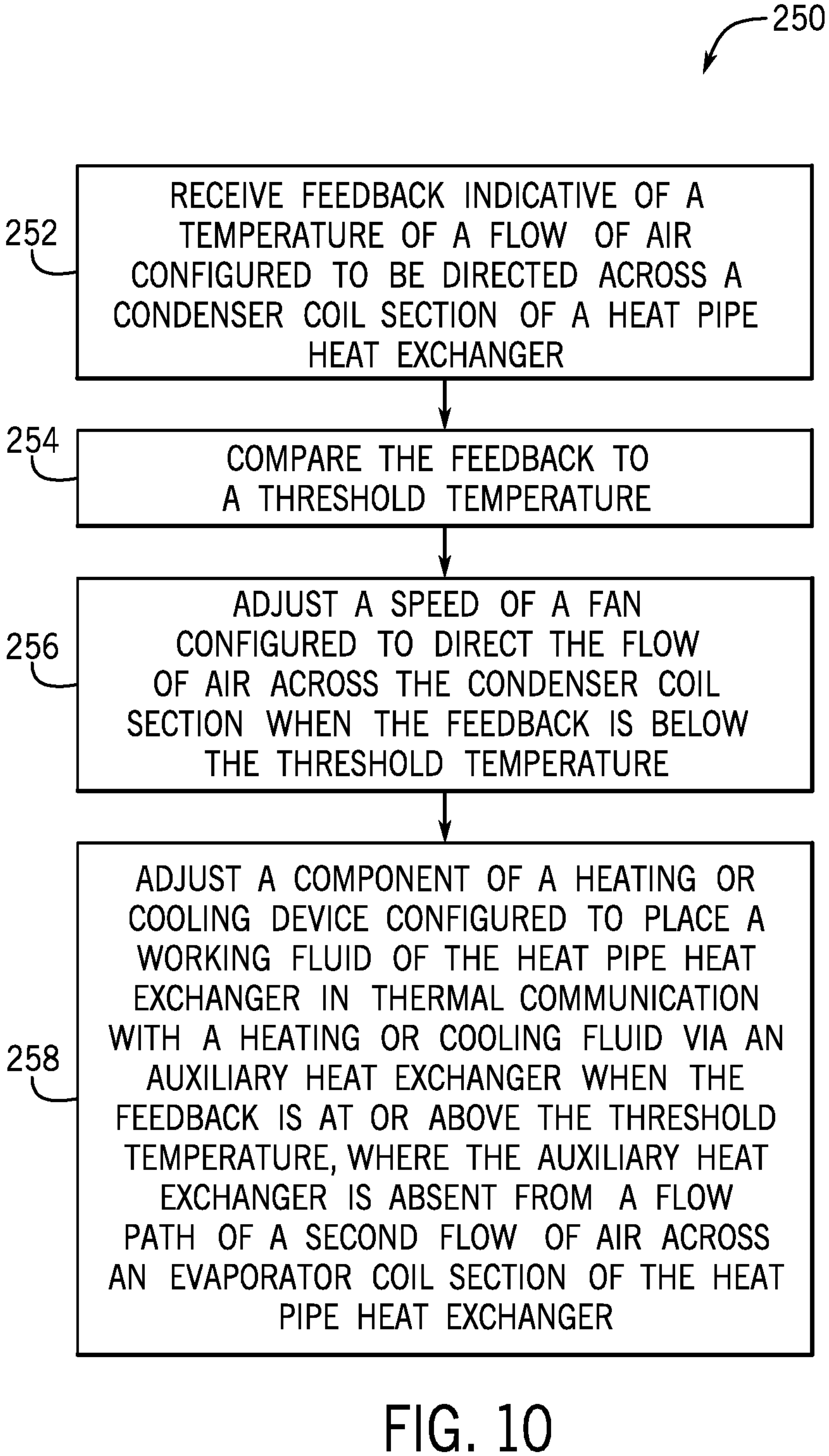

FIG. 4A is a plan view of an embodiment of the heat pipe heat exchanger of FIG. 2, FIG. 4B is a plan view of an embodiment of the heat pipe heat exchanger of FIG. 2 including a common working fluid circuit, FIG. 4C is a plan view of an embodiment of the heat pipe exchanger of FIG. 2 including a common working fluid circuit, and FIG. 4D is a plan view of an embodiment of the heat pipe exchanger of FIG. 2 including a first working fluid circuit and a second working fluid circuit separate from the first working fluid circuit, in accordance with an aspect of the present disclosure;

FIG. 5 is a plan view of an embodiment of the heat pipe heat exchanger of FIG. 2, in accordance with an aspect of the present disclosure;

FIG. 6 is a plan view of an embodiment of the heat pipe heat exchanger of FIG. 2, in accordance with an aspect of the present disclosure;

FIG. 7 is a plan view of an embodiment of the heat pipe heat exchanger of FIG. 2, in accordance with an aspect of the present disclosure;

FIG. 8 is a schematic of an embodiment of tubes of the auxiliary heat exchanger of FIGS. 2-7, in accordance with an aspect of the present disclosure;

FIG. 9 is a plan view of a schematic of an embodiment of the heat pipe heat exchanger of FIG. 2 within a housing, in accordance with an aspect of the present disclosure; and FIG. 10 is a block flow diagram of a process of operating the heat pipe heat exchanger of FIG. 2, in accordance with an aspect of the present disclosure.

DETAILED DESCRIPTION

The present disclosure is directed to heating, ventilating, and air conditioning (HVAC) systems that include a heat pipe heat exchanger. As used herein, a heat pipe heat exchanger includes an evaporator coil, or evaporator coil section, and a condenser coil, or condenser coil section disposed within a sealed housing. A working fluid, such as a volatile fluid, is passively circulated through the evaporator coil and the condenser coil without mechanical force, such as a pump or a compressor. As such, heat pipe heat exchangers utilize relatively low amounts of power to cool and/or heat an environment because the working fluid is circulated without mechanical force. The working fluid absorbs heat from a first air stream, such as hot return air from a conditioned environment, in the evaporator coil, such that the working fluid transitions from a liquid state to a gaseous state. A pressure drop occurs within the heat pipe as the working fluid evaporates in the evaporator coil. As such, gaseous working fluid flows from the evaporator coil toward and into the condenser coil, where the gaseous working fluid transfers heat to a second air stream, such as an outdoor air stream or an ambient air stream. The gaseous working fluid entering the condenser coil transitions from a gaseous state to a liquid state in the condenser coil. Liquid working fluid is then directed back to the evaporator via gravitational force and/or via a capillary force generated using a liquid return wick. In some embodiments, the evaporator coil section and the condenser coil section include the same tubes to enable fluid communication of the working fluid between the evaporator coil and the condenser coil. As such, the evaporator coil may be defined as the tubes, or the portions of tubes, that contact the first air stream and place the working fluid in thermal communication with the first air stream. Similarly, the condenser coil may be defined as the tubes, or the portions of tubes, that contact the second air stream and place the working fluid in thermal communication with the second air stream.

In some cases, the second air stream may include a relatively high temperature, such that the gaseous working fluid does not transfer sufficient heat to the second air stream to cause the gaseous working fluid to condense into the liquid working fluid. Air handling units employing traditional heat pipe heat exchangers include an additional cooling coil that is disposed within a flow path of the first air stream. The first air stream may be drawn across the evaporator coil section via a fan or blower. Accordingly, an increased amount of power is utilized to draw the first air stream across the evaporator coil section when the additional cooling coil is disposed within the flow path of the first air stream. Additionally, a size of an air handler unit that includes the heat pipe heat exchanger increases in order to accommodate the additional cooling coil in the flow path of the first air stream.

Embodiments of the present disclosure are directed to an enhanced configuration of a heat pipe heat exchanger having an auxiliary heat exchanger disposed outside of the flow path of the first air stream. As such, the heat pipe heat exchanger utilizes a reduced amount of power to draw the first air stream across the evaporator coil and/or reduces a size of the air handler unit that includes the heat pipe heat exchanger. In some embodiments, the auxiliary heat exchanger is disposed external to a housing of the air handler unit, where the auxiliary heat exchanger may place the working fluid in thermal communication with a heating or cooling fluid, such as water, a mixture of air and water, a refrigerant, or another suitable heating or cooling fluid. In other embodiments, the auxiliary heat exchanger is disposed adjacent to the condenser coil within the flow path of the second air stream. In still further embodiments, the auxiliary heat exchanger is disposed between, or along, plenum walls of the heat pipe heat exchanger, or the air handler unit, where the plenum walls isolate the flow paths of the first air stream and the second air stream from one another. In any case, the auxiliary heat exchanger is configured to receive the working fluid from the evaporator coil and/or the condenser coil and to provide additional heating or cooling when a temperature of the second air stream is insufficient to condense the working fluid in the condenser coil.

Figure 1:
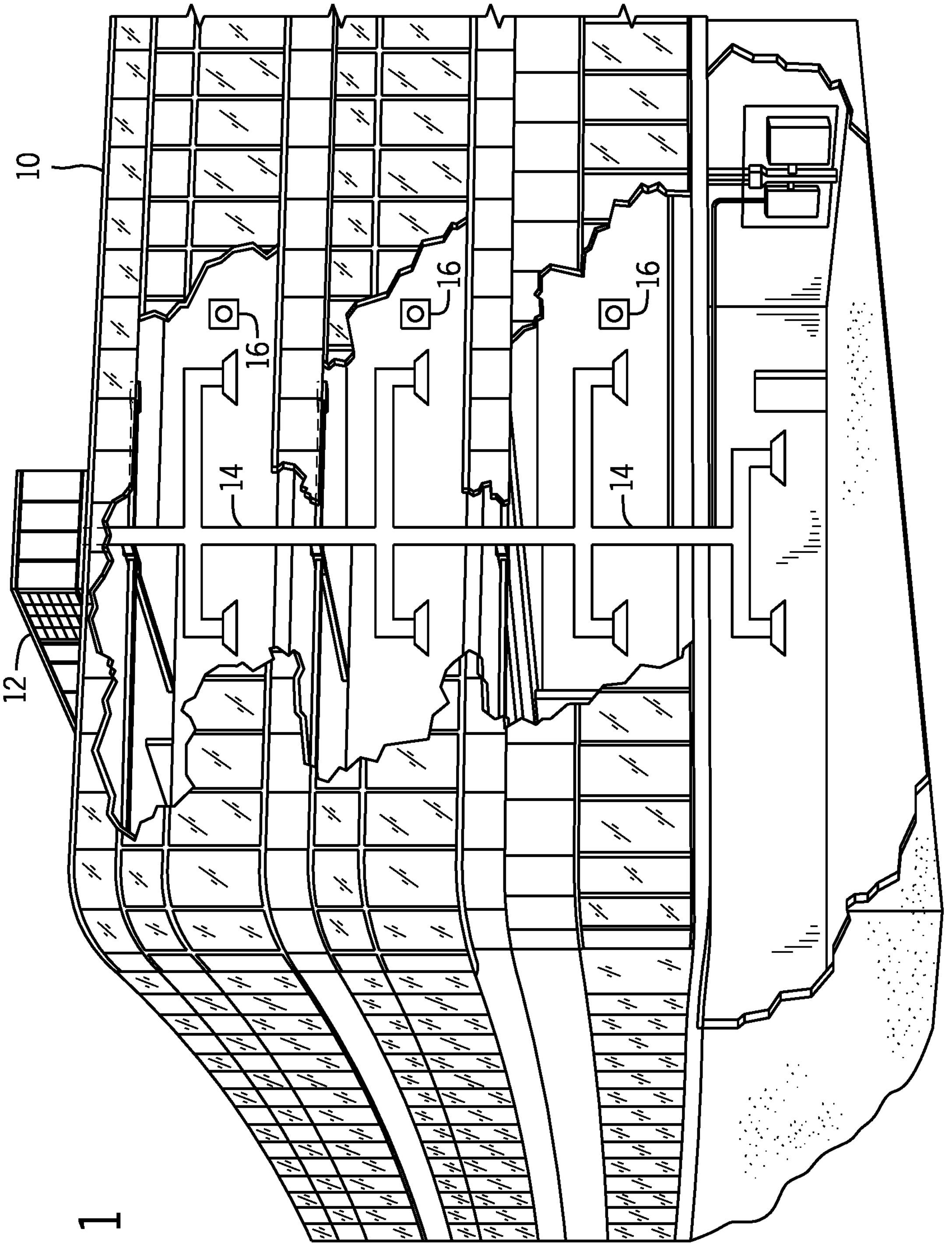
FIG. 1 is a schematic of an environmental control for building environmental management that may employ an HVAC unit, in accordance with an aspect of the present disclosure.

Turning now to the drawings, FIG. 1 illustrates a heating, ventilating, and air conditioning (HVAC) system for building environmental management that may employ an HVAC unit, such as a heat pipe heat exchanger. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single packaged unit containing other equipment, such as a blower, integrated air handler, and/or auxiliary heating unit.

The HVAC unit 12 is an air cooled device that provides conditioned air to the building 10. Specifically, the HVAC unit 12 may include heat exchanger coils across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may provide both heating and cooling to the building, such that the HVAC unit 12 operates in different modes.

A control device 16, one type of which may be a thermostat, may be used to designate the temperature of the conditioned air. The control device 16 also may be used to control the flow of air through the ductwork 14. For example, the control device 16 may be used to regulate operation of a component of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

As set forth above, embodiments of the present disclosure are directed to an improved heat pipe heat exchanger having an auxiliary heat exchanger that is positioned external to a housing of the heat pipe heat exchanger, between or adjacent to a plenum wall of the heat pipe heat exchanger, or within a flow path of air flowing across a condenser coil of the heat pipe heat exchanger. As such, the auxiliary heat exchanger is not disposed within a flow path of air flowing across an evaporator coil of the heat pipe heat exchanger. Thus, an amount of power utilized to draw air across the evaporator coil is reduced and a size of an air handler unit having the heat pipe heat exchanger may also be reduced. Additionally, bypass dampers included in traditional heat pipe heat exchangers, which enable the air flowing across the evaporator coil section to bypass the auxiliary heat exchanger, may be removed to further reduce a size of the air handler unit.

FIG. 2 is a perspective view of an embodiment of a heat pipe heat exchanger 50 that includes an auxiliary heat exchanger 52 disposed outside of a flow path of air flowing across an evaporator coil 54, or evaporator coil section, of the heat pipe heat exchanger 50. For example, as shown in the illustrated embodiment of FIG. 2, the auxiliary heat exchanger 52 may be positioned adjacent to a condenser coil 56, or condenser coil section, of the heat pipe heat exchanger 50. In other embodiments, the auxiliary heat exchanger 52 may be positioned in other suitable locations. In some embodiments, the auxiliary heat exchanger 52 includes extensions of tubes that form the condenser coil section 56. As such, tubes that form the auxiliary heat exchanger 52, or first tubes, may include the same material as the tubes of the condenser coil section 56, or second tubes, such as copper, aluminum, nickel, brass, a combination thereof, or another suitable material. In other embodiments, the auxiliary heat exchanger 52 includes tubes made from a different material than the tubes of the condenser coil section 56. As such, the tubes of the auxiliary heat exchanger 52 and the tubes of the condenser coil section 56 may be joined to one another via welding, coupling, or another suitable technique.

In any case, a first flow of air 58 is directed across the evaporator coil section 54. In some embodiments, the first flow of air 58 includes return air from an environment to be conditioned, such as a building, a room of the building, or another suitable environment. As such, the first flow of air 58 transfers thermal energy, such as heat, to the working fluid flowing through the evaporator coil section 54. The first flow of air 58 may be drawn across the evaporator coil section 54 via a first fan 60. Additionally, a second flow of air 62 is directed across the condenser coil section 56. The second flow of air 62 may be isolated from the first flow of air 58 via a plenum. The second flow of air 62 may include outdoor air or ambient air that absorbs heat from the working fluid flowing through the condenser coil section 56. In some embodiments, the second flow of air 62 is directed across the condenser coil section 56 via a second fan 64. Further, the auxiliary heat exchanger 52 may be in thermal communication with a heating or cooling fluid 66 that is different than the first flow of air 58 and the second flow of air 62. For instance, a heating or cooling device 68 may direct the heating or cooling fluid 66 toward the auxiliary heat exchanger 52 to place the working fluid flowing through the auxiliary heat exchanger 52 in thermal communication with the heating or cooling fluid 66.

In some embodiments, the heating or cooling fluid 66 is water and the heating or cooling device 68 is a water source. As such, the auxiliary heat exchanger 52 enables thermal energy transfer between the working fluid flowing through the auxiliary heat exchanger 52 and water surrounding the tubes of the auxiliary heat exchanger 52. For instance, a shell or box surrounding the tubes of the auxiliary heat exchanger 52 may receive water from the water source, such that water may be directed through the shell or box to transfer or absorb thermal energy to or from the working fluid flowing through the tubes of the auxiliary heat exchanger 52. In other embodiments, the heating or cooling fluid 66 is a mixture of water and air and the heating or cooling device is an evaporative cooler. For instance, the auxiliary heat exchanger 52 may enable thermal energy transfer between the working fluid flowing through the auxiliary heat exchanger 52 and water sprayed onto the tubes of the auxiliary heat exchanger 52 and/or air directed across the auxiliary heat exchanger 52. Accordingly, the auxiliary heat exchanger 52 may transfer or absorb thermal energy to or from the working fluid via evaporative cooling. In still further embodiments, the heating or cooling fluid 66 is a refrigerant and the heating or cooling device 68 is a chiller, refrigeration system, or heating system. In such embodiments, the auxiliary heat exchanger 52 may be in thermal communication with the refrigerant of the chiller, refrigeration system, or heating system via a shell and tube heat exchanger, for example. In any case, the auxiliary heat exchanger 52 enables the removal of thermal energy from the working fluid utilizing a source other than the second flow of air 62.

As shown in the illustrated embodiment of FIG. 2, the working fluid may flow through each of the evaporator coil section 54, the condenser coil section 56, and the auxiliary heat exchanger 52 during operation of the heat pipe heat exchanger 50. To control whether the working fluid is in thermal communication with the first flow of air 58, the second flow of air 62, and/or the heating or cooling fluid 66, a control system 70 may be coupled to the first fan 60, the second fan 64, and/or a component of the heating or cooling device 68. The control system 70 may include instructions stored on machine-readable media, such as a memory 72, that is configured to be executed by a processor 74 of the control system 70.

The control system 70 may receive feedback indicative of a temperature of the second flow of air 62 from a sensor 76. In some embodiments, the control system 70 compares the feedback to a predetermined temperature threshold, which may be based on a condensation temperature of the working fluid of the heat pipe heat exchanger 50. When the feedback indicates that the temperature of the second flow of air 62 is below the predetermined temperature threshold, the control system 70 may control a speed of the second fan 64 to provide a sufficient amount of thermal energy transfer between the working fluid and the second flow of air 62. Conversely, when the feedback indicates that the temperature of the second flow of air 62 is at or above the predetermined temperature threshold, the control system 70 may deactivate the second fan 64 and activate the heating or cooling device 68 to direct the heating or cooling fluid 66 toward the auxiliary heat exchanger 52. Additionally or alternatively, the control system 70 may be configured to adjust a speed of the first fan 60 based on a temperature of the first flow of air 58 downstream of the evaporator coil section 54 with respect to a flow of the first flow of air 58 through the heat pipe heat exchanger 50. In some embodiments, the working fluid flows through each of the evaporator coil section 54, the condenser coil section 56, and the auxiliary heat exchanger 52, regardless of whether the second flow of air 62 or the heating or cooling fluid 66 is in thermal communication with the working fluid.

Figure 3:
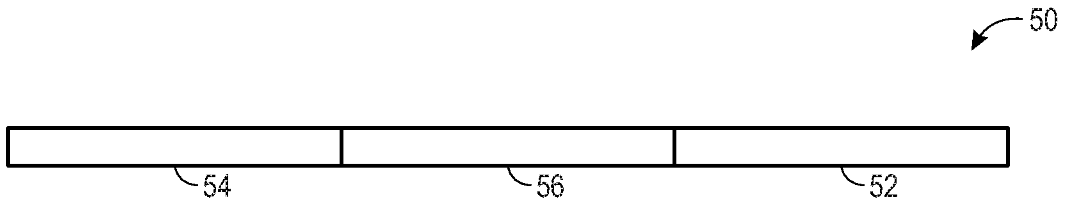
FIG. 3 is a plan view of an embodiment of the heat pipe heat exchanger of FIG. 2, in accordance with an aspect of the present disclosure.

As discussed above, the heat pipe heat exchanger 50 may include various configurations with respect to positions of the evaporator coil section 54, the condenser coil section 56, and the auxiliary heat exchanger 52 within a housing of the heat pipe heat exchanger 50. For example, FIGS. 3-7 illustrate plan views of embodiments of the evaporator coil section 54, the condenser coil section 56, and the auxiliary heat exchanger 52 with respect to one another within the heat pipe heat exchanger 50. FIG. 3 includes substantially the same configuration as that of the heat pipe heat exchanger 50 described with respect to FIG. 2 above. As shown in the illustrated embodiment of FIG. 3, the auxiliary heat exchanger 52 is positioned adjacent to the condenser coil section 56. Thus, the condenser coil section 56 is disposed between the evaporator coil section 54 and the auxiliary heat exchanger 52.

FIG. 4A is a plan view of an embodiment of the heat pipe heat exchanger 50 where the evaporator coil section 54 is disposed between the condenser coil section 56 and the auxiliary heat exchanger 52. In some embodiments, the working fluid is directed through each of the evaporator coil section 54, the condenser coil section 56, and the auxiliary heat exchanger 52. As such, the evaporator coil section 54, the condenser coil section 56, and the auxiliary heat exchanger 52 form a common working fluid circuit. For instance, as illustrated in FIG. 4B, the working fluid may flow within a common working fluid circuit 90 from the evaporator coil section 54 to the condenser coil section 56, from the condenser coil section 56 to the auxiliary heat exchanger 52, via the evaporator coil section 54, and from the auxiliary heat exchanger 52 back to the evaporator coil section 54. Similarly, as illustrated in FIG. 4C, the working fluid may flow within a common working fluid circuit 92 from the evaporator coil section 54 to the auxiliary heat exchanger 52, from the auxiliary heat exchanger 52 to the condenser coil section 56, via the evaporator coil section 54, and from the condenser coil section 56 back to the evaporator coil section 54. In other embodiments, the heat pipe heat exchanger 50 may include multiple closed circuits. As such, as illustrated in FIG. 4D, a first working fluid may flow through a first working fluid circuit 94 between the evaporator coil section 54 and the condenser coil section 56 and a second working fluid, isolated from the first working fluid, may flow through a second working fluid circuit 96 between the evaporator coil section 54 and the auxiliary heat exchanger 52. As such, a flow path of the working fluid may be reduced.

FIGS. 5-7 are plan views of embodiments of the heat pipe heat exchanger 50, in which a length 100 of the auxiliary heat exchanger 52 is positioned cross-wise, or substantially perpendicular, to a length 102 of the evaporator coil section 54, or a length 104 of the condenser coil section 56, or both the length 102 of the evaporator coil section 54 and the length 104 of the condenser coil section 56. In other words, the length 100 of the auxiliary heat exchanger 52 and the lengths 102 and/or 104 of the evaporator coil section 54 and/or the condenser coil section 56 form an angle of between 0 degrees and 110 degrees, between 5 degrees and 100 degrees, between 30 degrees and 95 degrees, or approximately 90 with respect to one another. Positioning the length 100 of the auxiliary heat exchanger 52 substantially perpendicular to the lengths 102 and/or 104 of the evaporator coil section 54 and/or the condenser coil section 56 may enable the auxiliary heat exchanger 52 to be positioned within or adjacent to a plenum wall of a housing of the heat pipe heat exchanger 50, or a housing of an air handler unit. As such, a size of the housing of the heat pipe heat exchanger 50, or the air handler unit, may be reduced in comparison to heat pipe heat exchangers that include an additional heat exchanger, or heat exchanger coil, within a flow path of the first flow of air 58.

As shown in the illustrated embodiment of FIG. 5, the length 100 of the auxiliary heat exchanger 52 extends from a junction 110 coupling the evaporator coil section 54 and the condenser coil section 56 to one another. Accordingly, the auxiliary heat exchanger 52 may be positioned adjacent to a plenum wall 112 that is configured to isolate the first flow of air 58 across the evaporator coil section 54 from the second flow of air 62 across the condenser coil section 56. In other embodiments, the auxiliary heat exchanger 52 may at least partially form the plenum wall 112. In such embodiments, a shell or casing 114 surrounding the auxiliary heat exchanger 52 may form the plenum wall and block the first flow of air 58 from flowing across the condenser coil section 56 and/or block the second flow of air 62 from flowing across the evaporator coil section 54. In other words, the shell or casing 114 of the auxiliary heat exchanger 52 blocks the first flow of air 58 and the second flow of air 62 from mixing with one another.

As discussed above, in certain embodiments, the working fluid within the heat pipe heat exchanger 52 may flow through tubes of each of the evaporator coil section 54, the condenser coil section 56, and the auxiliary heat exchanger 52 during operation, regardless of whether the working fluid is in thermal communication with the second flow of air 62 or the heating or cooling fluid 66. In other embodiments, two closed circuits may be included in the heat pipe heat exchanger 50, such that a first working fluid flows between the evaporator coil section 54 and the condenser coil section 56 in a first mode of operation and a second working fluid flows between the evaporator coil section 54 and the auxiliary heat exchanger 52 in a second mode of operation. Additionally or alternatively, each tube of the evaporator coil section 54, the condenser coil section 56, and/or the auxiliary heat exchanger 52 may be an individual circuit of, or a single pass through, each of the evaporator coil section 54, the condenser section 56, and/or the auxiliary heat exchanger 52. In other embodiments, two or more tubes of the evaporator coil section 54, the condenser coil section 56, and/or the auxiliary heat exchanger 52 may form an individual circuit of, or multiple passes through, each of the evaporator coil section 54, the condenser section 56, and/or the auxiliary heat exchanger 52. In other words, the evaporator coil section 54, the condenser coil section 56, and/or the auxiliary heat exchanger 52 may include single pass circuits and/or multi-pass circuits that are configured to direct the working fluid through the evaporator coil section 54, the condenser coil section 56, and/or the auxiliary heat exchanger 52.

FIG. 6 is a plan view of an embodiment of the heat pipe heat exchanger 50 having the length 100 of the auxiliary heat exchanger 52 positioned substantially perpendicular to the length 102 of the evaporator coil section 54. Further, the auxiliary heat exchanger 52 is positioned on a first end 130 of the evaporator coil section 54 that is opposite a second end 132 of the evaporator coil section 54 forming the junction 110 between the evaporator coil section 54 and the condenser coil section 56. Positioning both the auxiliary heat exchanger 52 and the condenser coil section 56 adjacent to the evaporator coil section 54 may enhance an efficiency of the heat pipe heat exchanger 50 because a flow path of liquid working fluid from the auxiliary heat exchanger 52 and/or the condenser coil section 56 to the evaporator coil section 54 is reduced.

Further, positioning the auxiliary heat exchanger 52 such that the length 100 is substantially perpendicular to the length 102 of the evaporator coil section 54 may enable the auxiliary heat exchanger 52 to be positioned adjacent to a plenum wall 134 of the housing of the heat pipe heat exchanger 50. In some embodiments, the auxiliary heat exchanger 52 forms at least a portion of the plenum wall 134. As discussed above, the auxiliary heat exchanger 52 may be surrounded by the shell or casing 114, which may block the first flow of air 58 from exiting the housing of the heat pipe heat exchanger 50. In any case, the auxiliary heat exchanger 52 is not positioned directly within the first flow of air 58, which may reduce an amount of power utilized by the first fan 60 to direct the first air flow 58 across the evaporator coil section 54. Further, a size of the housing of the heat pipe heat exchanger 50, or the housing of the air handler unit, is reduced by positioning the auxiliary heat exchanger 52 adjacent to the plenum wall 134 and/or as part of the plenum wall 134.

FIG. 7 is an embodiment of the heat pipe heat exchanger 50, where the length 100 of the auxiliary heat exchanger 52 is positioned substantially perpendicular to the length 104 of the condenser coil section 56. Further, the auxiliary heat exchanger 52 is positioned on a first end 150 of the condenser coil section 56 that is opposite a second end 152 of the condenser coil section 56 forming the junction 110 between the evaporator coil section 54 and the condenser coil section 56. Positioning the auxiliary heat exchanger 52 such that the length 100 is substantially perpendicular to the length 104 of the condenser coil section 56 may enable the auxiliary heat exchanger 52 to be positioned adjacent to a plenum wall 154 of the housing of the heat pipe heat exchanger 50. In some embodiments, the auxiliary heat exchanger 52 forms at least a portion of the plenum wall 154. As discussed above, the auxiliary heat exchanger 52 may be surrounded by the shell or casing 114, which may block the second flow of air 62 from exiting the housing of the heat pipe heat exchanger 50. In any case, the auxiliary heat exchanger 52 may not be positioned directly within the first flow of air 58 and/or the second flow of air 62, which may reduce an amount of power utilized by the first fan 60 and/or the second fan 64 to direct the first air flow 58 across the evaporator coil section 54 and/or to direct the second air flow 62 across the condenser coil section 56. Further, a size of the housing of the heat pipe heat exchanger 50, or a size of the housing of the air handler unit, is reduced by positioning the auxiliary heat exchanger 52 adjacent to the plenum wall 154 and/or as part of the plenum wall 154.

FIG. 8 is a schematic of an embodiment of tubes 170 of the auxiliary heat exchanger 52, or first tubes, extending from a fin pack 172 of the evaporator coil section 54 and/or condenser coil section 56. The fin pack 172 of the evaporator coil section 54 and/or the condenser coil section 56 may include a plurality of fins 174 that surround tubes 176 of the evaporator coil section 54 and/or the condenser coil section 56, or second tubes. As such, the tubes 170 of the auxiliary heat exchanger 52 may be extensions of the tubes 176 of the evaporator coil section 54 and/or the condenser coil section 56 that do not contact and/or otherwise place the working fluid in thermal communication with the first flow of air 58 and/or the second flow of air 62. In other embodiments the tubes 170 of the auxiliary heat exchanger 52 are coupled to the tubes 176 of the evaporator coil section 54 and/or the condenser coil section 56 via welding, coupling, fittings, or other suitable techniques. In any case, the tubes 170 of the auxiliary heat exchanger 52 are fluidly coupled to the tubes 176 of the evaporator coil section 54 and/or the condenser coil section 56, such that the tubes 170 of the auxiliary heat exchanger 52 receive and circulate the working fluid of the heat pipe heat exchanger 50. As used herein, fluidly coupled refers to a flow path between various components that enables the working fluid to flow from a first component, such as the evaporator coil section 54, to a second component, such as the condenser coil section 56 and/or the auxiliary heat exchanger 52. The tubes 170 of the auxiliary heat exchanger 52 are positioned, such that the tubes 170 do not contact and/or otherwise place the working fluid in thermal communication with the first flow of air 58 and/or the second flow of air 62.

In some embodiments, the tubes 170 of the auxiliary heat exchanger 52 are surrounded by the shell or casing 114. Additionally or alternatively, the tubes 170 of the auxiliary heat exchanger 52 may include fins. The shell or casing 114 may include an inlet 178 and an outlet 180 for the heating or cooling fluid 66. In some embodiments, the heating or cooling fluid 66 is water that is received from a hot or cool water source, such as a geothermal source or a cold water supply to a building. Accordingly, the water enters the shell or casing 114 through the inlet 178 and fills the shell or casing 114, such that water completely surrounds each of the tubes 170 of the auxiliary heat exchanger 52. As such, the working fluid flowing through the tubes 170 of the auxiliary heat exchanger 52 is in thermal communication with the water within the shell or casing 114. In other embodiments, the shell or casing 114 may receive a refrigerant from a chiller, a refrigeration system, a heating system, or another suitable HVAC unit. Additionally or alternatively, the heating or cooling fluid 66 may not completely fill the shell or casing 114 when the tubes 170 of the auxiliary heat exchanger 52 are disposed in a portion of the shell or casing 114. In such embodiments, the auxiliary heat exchanger 52 may act as a flooded evaporator or a flooded condenser.

In other embodiments, each tube 170 of the auxiliary heat exchanger 52 may be surrounded by an annulus configured to flow the heating or cooling fluid 66 as opposed to the shell or casing 114 that surrounds all of the tubes 170 collectively. In still further embodiments, the tubes 170 of the auxiliary heat exchanger 52 may be exposed or not covered by the shell or casing 114. For example, a spray nozzle 200 may be utilized to direct a fluid, such as water, on exposed surfaces of the tubes 170. Further, a fan 202 may direct a third flow of air 204 across the tubes 170 to enable thermal energy transfer between the working fluid flowing through the tubes 170 and the third flow of air 204 via evaporative cooling.

FIG. 9 is a plan view of an embodiment of the heat pipe heat exchanger 50 having a housing 220 and plenum walls 222. As shown in the illustrated embodiment of FIG. 9, the heat pipe heat exchanger 50 includes a first plenum wall 224 and a second plenum wall 226, which form at least a portion of the housing 220. Further, the heat pipe heat exchanger 50 includes a third plenum wall 228 that isolates the first flow of air 58 across the evaporator coil section 54 and the second flow of air 62 across the condenser coil section 56 from one another. In some embodiments, the housing 220 is substantially air-tight, such that the first flow of air 58 and/or the second flow of air 62 are maintained within a first passage 230 of the heat pipe heat exchanger 50 and a second passage 232 of the heat pipe heat exchanger 50, respectively. As used herein, the first passage 230 refers to a first flow structure that is configured to direct a flow path of air within the housing 220 of the heat pipe heat exchanger 50 that contacts tubes of the evaporator coil section 54. Similarly, the second passage 232 refers to second flow structure that is configured to direct a flow path of air within the housing 220 of the heat pipe heat exchanger that contacts tubes of the condenser coil section 56. The first flow structure and the second flow structure are integral to the housing 220 of the heat pipe heat exchanger 50.

While the illustrated embodiment of FIG. 9 shows the auxiliary heat exchanger 52 positioned adjacent to the condenser coil section 56 and external to the housing 220, it should be noted that the auxiliary heat exchanger 52 may be positioned in any configuration described above with respect to FIGS. 3-7 or in other configurations. Further, in other embodiments, the auxiliary heat exchanger 52 may be positioned in an interior of the housing 220. In still further embodiments, the auxiliary heat exchanger 52 may be disposed between and/or form the first plenum wall 224, the second plenum wall 226, and/or the third plenum wall 228. In any case, the auxiliary heat exchanger 52 is not directly disposed in the first passage 230 and/or the second passage 232 of the heat pipe heat exchanger 50. For instance, the flow paths of air through the first passage 230 and/or the second passage 232 are not directed across tubes of the auxiliary heat exchanger 52. Thus, an amount of power utilized to direct the first flow of air 58 across the evaporator coil section 54 using the first fan 60 and an amount of power utilized to direct the second flow of air 62 across the condenser coil section 56 using the second fan 64 may be reduced. Further, a size of the housing 220 of the heat pipe heat exchanger 50 may be reduced because the first passage 230 and/or the second passage 232 may be reduced as a result of removal of the auxiliary heat exchanger 52 from the first passage 230 and/or the second passage 232. In some embodiments, a length 236 of the heat pipe heat exchanger 50 may be reduced when compared to traditional heat pipe heat exchangers that dispose the auxiliary heat exchanger 52 in the first passage 230. For instance, the length 236 of the heat pipe heat exchanger 50 may be reduced between 1% and 25%, between 5% and 20%, or between 10% and 15% of a length of traditional heat pipe heat exchangers.

In some embodiments, the heat pipe heat exchanger 50 may include a condensate drain pan 238 disposed downstream of, or proximate to, the evaporator coil section 54 with respect to the first flow of air 58. For instance, as the first flow of air 58 is directed across the evaporator coil section 54, the first flow of air 58 transfers thermal energy to the working fluid flowing through the evaporator coil section 54. Accordingly, water or other fluid particles present in the first flow of air 58 may condense into liquid droplets, which may accumulate on tubes of the evaporator coil section 54 and/or otherwise within the housing 220 of the heat pipe heat exchanger 50. The condensate drain pan 238 may collect any liquid droplets that form as a result of cooling provided by the evaporator coil section 54 and enable the liquid droplets to ultimately flow out of the housing 220.

FIG. 10 is a block diagram of a process 250 for operating and/or controlling the heat pipe heat exchanger 50. For example, at block 252, the control system 70 receives feedback from the sensor 76 indicative of a temperature of the second flow of air 62 configured to be directed across the condenser coil section 56. As discussed above, the second flow of air 62 may be outside air or ambient air. When the temperature of the second flow of air 62 is relatively high, the second flow of air 62 may not absorb sufficient thermal energy from the working fluid flowing through the condenser coil section 56 to enable the working fluid to transition from the gaseous state to a liquid state. As such, the control system 70 may store a threshold temperature within the memory 72, where the threshold temperature is based at least on a condensation temperature of the working fluid of the heat pipe heat exchanger 50. For instance, the threshold temperature may include a temperature of air that is sufficient to absorb a predetermined amount of thermal energy from the working fluid to condense the working fluid. In any case, the control system 70 compares the feedback received from the sensor 76 to the threshold temperature, as shown at block 254.

At block 256, the control system 70 adjusts a speed of the second fan 64 when the feedback received from the sensor 76 is below the threshold temperature. In some embodiments, the second fan 64 is a variable speed fan, such that the speed of the second fan 64 may be adjusted to provide a predetermined amount of cooling to the working fluid flowing through the condenser coil section 56. For example, as the temperature of the second flow of air 62 increases, a speed of the second fan 64 may also increase in order to provide sufficient cooling to the working fluid flowing through the condenser coil section 56. Similarly, as the temperature of the second flow of air 62 decreases, a speed of the second fan 64 is reduced because less air flow across the condenser coil section 56 may be utilized to sufficiently condense the working fluid flowing through the condenser coil section 56. As such, power utilized by the second fan 64 is reduced and an efficiency of the heat pipe heat exchanger increases. In other embodiments, the second fan 64 is not a variable speed fan. In such embodiments, the control system 70 may be configured to activate the second fan 64 when the feedback received from the sensor 76 is below the threshold temperature. Additionally or alternatively, the control system 70 may be configured to deactivate, or turn off, a component of the heating or cooling device when the feedback received from the sensor 76 is below the threshold temperature.

At block 258, the control system 70 adjusts a component of the heating or cooling device 68 when the feedback received from the sensor 76 is at or above the threshold temperature. The component of the heating or cooling device 68 may direct a flow of the heating or cooling fluid 66 toward the auxiliary heat exchanger 52, thereby placing the working fluid flowing through the auxiliary heat exchanger 52 in thermal communication with the heating or cooling fluid 66. The heating or cooling fluid 66 provides sufficient cooling to condense the working fluid flowing through the condenser coil section 56 when the temperature of the second flow of air 62 is above the threshold temperature. Additionally, the control system 70 may deactivate the second fan 64 when the feedback received from the sensor 76 is at or above the threshold temperature. As discussed above, the auxiliary heat exchanger 52 is absent from the first passage 230 which includes the first flow of air 58. Accordingly, an amount of power utilized by the first fan 60 is reduced because the first flow of air 58 may be directed through the first passage 230 with less resistance. Additionally, the size of the housing 220 of the heat pipe heat exchanger 50 may be reduced because the first passage 230 is not sized to accommodate the auxiliary heat exchanger 52 in addition to the evaporator coil section 54.

As set forth above, embodiments of the present disclosure may provide one or more technical effects useful in enhancing an efficiency of a heat pipe heat exchanger. For example, an auxiliary heat exchanger of the heat pipe heat exchanger is absent from a flow path of a flow of air across an evaporator coil of the heat pipe heat exchanger. As such, a fan directing the flow of air across the evaporator coil utilizes less power because of a reduction in resistance. Further, positioning the auxiliary heat exchanger outside of the flow path of the flow of air across the evaporator coil may reduce a size of an air handler unit that includes the heat pipe heat exchanger. As such, an air handler unit having the heat pipe heat exchanger of the present disclosure includes a reduced footprint when compared to existing air handler units. The technical effects and technical problems in the specification are examples and are not limiting. It should be noted that the embodiments described in the specification may have other technical effects and can solve other technical problems.

While only certain features and embodiments have been illustrated and described, many modifications and changes may occur to those skilled in the art, such as variations in sizes, dimensions, structures, shapes and proportions of the various elements, values of parameters, such as temperatures and pressures, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode, or those unrelated to enablement. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heat exchanger, comprising:

an evaporator coil section disposed at least partially within a first flow structure configured to direct a first flow of air across the evaporator coil section;

a condenser coil section fluidly coupled with the evaporator coil section and disposed at least partially within a second flow structure configured to direct a second flow of air across the condenser coil section; and an auxiliary heat exchanger fluidly coupled with the evaporator coil section, wherein the auxiliary heat exchanger is external to the first flow structure.

2. The heat exchanger of claim 1, wherein the evaporator coil section and the condenser coil section are configured to operate together as a heat pipe heat exchanger.

3. The heat exchanger of claim 1, wherein the evaporator coil section, the condenser coil section, and the auxiliary heat exchanger are in a common working fluid circuit.

4. The heat exchanger of claim 1, wherein:

the evaporator coil section and the condenser coil section are in a first working fluid circuit; and the auxiliary heat exchanger and the evaporator coil section are in a second working fluid circuit that is separate from the first working fluid circuit.

5. The heat exchanger of claim 1, wherein the auxiliary heat exchanger comprises a plurality of first tubes that extend from a plurality of second tubes of the condenser coil section.

6. The heat exchanger of claim 5, comprising a shell disposed about the plurality of first tubes, wherein the shell is configured to receive a refrigerant from a chiller and place the refrigerant in thermal communication with working fluid flowing through the plurality of first tubes.

7. The heat exchanger of claim 5, comprising a shell disposed about the plurality of first tubes, wherein the shell is configured to receive water from a water source and place the water in thermal communication with working fluid flowing through the plurality of first tubes.

8. The heat exchanger of claim 5, comprising a shell disposed about the plurality of first tubes, wherein the shell is configured to at least partially form a plenum wall of the the first flow structure, the second flow structure, or both.

9. The heat exchanger of claim 5, comprising a spray nozzle and a fan, wherein the spray nozzle is configured to direct fluid over exposed surfaces of the plurality of first tubes, and wherein the fan is configured to direct a third flow of air across the plurality of first tubes.

10. The heat exchanger of claim 1, wherein the first flow structure and the second flow structure are integral features of a housing, and wherein the auxiliary heat exchanger is disposed external to the housing.

11. The heat exchanger of claim 1, wherein flow paths within the first flow structure and the second flow structure are isolated from one another via a plenum wall, and wherein the auxiliary heat exchanger is positioned adjacent to the plenum wall.

12. The heat exchanger of claim 1, wherein the first flow of air comprises return air from a conditioned environment and the second flow of air comprises outdoor air.

13. The heat exchanger of claim 1, wherein the auxiliary heat exchanger is positioned adjacent to the evaporator coil section.

14. The heat exchanger of claim 13, wherein a length of the auxiliary heat exchanger is positioned crosswise to a length of the evaporator coil section.

15. The heat exchanger of claim 1, comprising a condensate drain pan configured to collect liquid formed as a result of cooling provided by the evaporator coil section.

16. The heat exchanger of claim 1, wherein a working fluid is configured to circulate between the evaporator coil section, the condenser coil section, and the auxiliary heat exchanger without mechanical force.

17. A heat exchanger for a heating, ventilating, and air conditioning (HVAC) system, comprising:

a housing;

an evaporator coil section disposed within a first passage of the housing and configured to be in thermal communication with a first flow of air flowing across the evaporator coil section;

a condenser coil section in fluid communication with the evaporator coil section and disposed within a second passage of the housing and configured to be in thermal communication with a second flow of air flowing across the condenser coil section; and an auxiliary heat exchanger in fluid communication with the evaporator coil section, wherein the auxiliary heat exchanger is external to the housing.

18. The system of claim 17, comprising a plenum wall disposed within the housing and configured to isolate the first passage and the second passage from one another.

19. The system of claim 17, wherein the auxiliary heat exchanger is positioned adjacent to an external surface of the housing.

20. The system of claim 17, wherein the auxiliary heat exchanger is positioned adjacent to the evaporator coil section.

21. The system of claim 20, wherein a length of the auxiliary heat exchanger is positioned crosswise to a length of the evaporator coil section.

22. A heat pipe heat exchanger for a heating, ventilating, and air conditioning (HVAC) system, comprising:

a first passage comprising an evaporator coil section;

a second passage comprising a condenser coil section, wherein the condenser coil section is in fluid communication with the evaporator coil section; and an auxiliary heat exchanger in fluid communication with the evaporator coil section, wherein the auxiliary heat exchanger is external to the first passage and the second passage.

23. The heat pipe heat exchanger of claim 22, comprising a control system configured to receive feedback from a sensor indicative of a temperature of air surrounding a housing of the heat pipe heat exchanger, wherein the control system is configured to selectively operate a condenser fan based on the feedback.

24. The heat pipe heat exchanger of claim 23, wherein the control system is configured to adjust a speed of the condenser fan when the temperature is less than a threshold temperature.

25. The heat pipe exchanger of claim 22, wherein a length of the auxiliary heat exchanger is positioned crosswise to a length of the evaporator coil section.

* * * * *